United States Patent [19]
Carr

[11] Patent Number: 5,600,918
[45] Date of Patent: Feb. 11, 1997

[54] APPARATUS FOR KILLING WEEDS

[76] Inventor: Edwin R. Carr, 4522 Maverick St., Amarillo, Tex. 79109

[21] Appl. No.: 294,387

[22] Filed: Aug. 23, 1994

[51] Int. Cl.⁶ .............................. A01B 1/00; A01G 7/00
[52] U.S. Cl. ............................................................ 47/1.3
[58] Field of Search .............................. 42/1.3; 310/328, 310/339

[56] References Cited

U.S. PATENT DOCUMENTS

| | | | |
|---|---|---|---|
| 1,737,866 | 12/1929 | Roe | 47/1.3 |
| 2,588,561 | 3/1952 | Opp et al. | 47/1.3 |
| 3,771,249 | 11/1973 | Johnson et al. | 43/6 |
| 3,935,670 | 2/1976 | Pluenneke et al. | 47/1.3 |
| 3,949,248 | 4/1976 | Duffner et al. | 310/339 |
| 4,139,792 | 2/1979 | Kondo | 310/339 |
| 4,257,190 | 3/1981 | Dykes | 47/1.3 |
| 4,338,744 | 7/1982 | Gilmore | 47/1.3 |
| 4,719,534 | 1/1988 | Ward | 361/232 |

FOREIGN PATENT DOCUMENTS

| | | | |
|---|---|---|---|
| 3121254 | 12/1982 | Germany | 310/339 |
| 189679 | 8/1986 | Japan | 310/339 |
| 2170056 | 7/1986 | United Kingdom | 310/339 |

*Primary Examiner*—James R. Feyrer
*Attorney, Agent, or Firm*—Jack A. Kanz

[57] ABSTRACT

Apparatus which comprises a housing having a compartment and a shaft, a piezoelectric crystal captured in the compartment of the housing and an actuator assembly slideably disposed in said shaft for selectively applying a compressive force to the crystal is used to kill weeds by impressing a voltage across the roots of the weed. An electrically conductive path is formed between one end of the crystal and ground. A second electrically conductive path is formed between the other end of the crystal and a probe adapted for insertion into the roots of a weed. When a compressive force is applied to the crystal, the voltage generated is passed through the root to ground to kill the root, thereby destroying the weed.

2 Claims, 3 Drawing Sheets

5,600,918

APPARATUS FOR KILLING WEEDS

This invention relates generally to weed killers. More particularly, it relates to methods and apparatus using a piezoelectric voltage source for applying a voltage across the roots of a weed or other unwanted vegetation to destroy the root and prevent further growth of the unwanted vegetation.

Weeds are the bane of any gardener's lawn or bed. Unfortunately, they flourish in most soils and under most conditions and seem to survive drought and excessive heat. Conventional methods for killing weeds include physically removing the weed and its roots using a digging tool or by poisoning the weed using chemical applications.

Physical removal is tedious, labor intensive and all too often proves unsuccessful. If all the roots are not removed the weed will often reappear. Chemical applications are likewise not always successful and require careful handling. More significantly, most weed-killing chemicals are toxic to people and animals. Therefore, alternative methods and apparatus which eliminate application of potentially hazardous chemicals and alleviate intensity of the physical labor associated with physical removal of weeds are highly desireable.

In accordance with the present invention, a self-powered weed killer is provided which, in the preferred embodiment, includes a piezoelectric crystal captured in a tubular housing, an actuator assembly to apply a compressive force to the crystal and generate voltage and a probe for applying the voltage across the roots of a weed to kill the weed roots. In the preferred embodiment, the apparatus is very lightweight and durable, permitting portability and easy use. The apparatus is completely self-contained and self-powered. The operator merely needs to inject the probe into the weed roots and compress the piezoelectric crystal to generate a weed-killing voltage. Other features and advantages of the invention will become more readily understood from the following detailed description taken in connection with the appended claims and attached drawing, wherein like reference numerals have been applied to like elements, in which:

Figure 1:
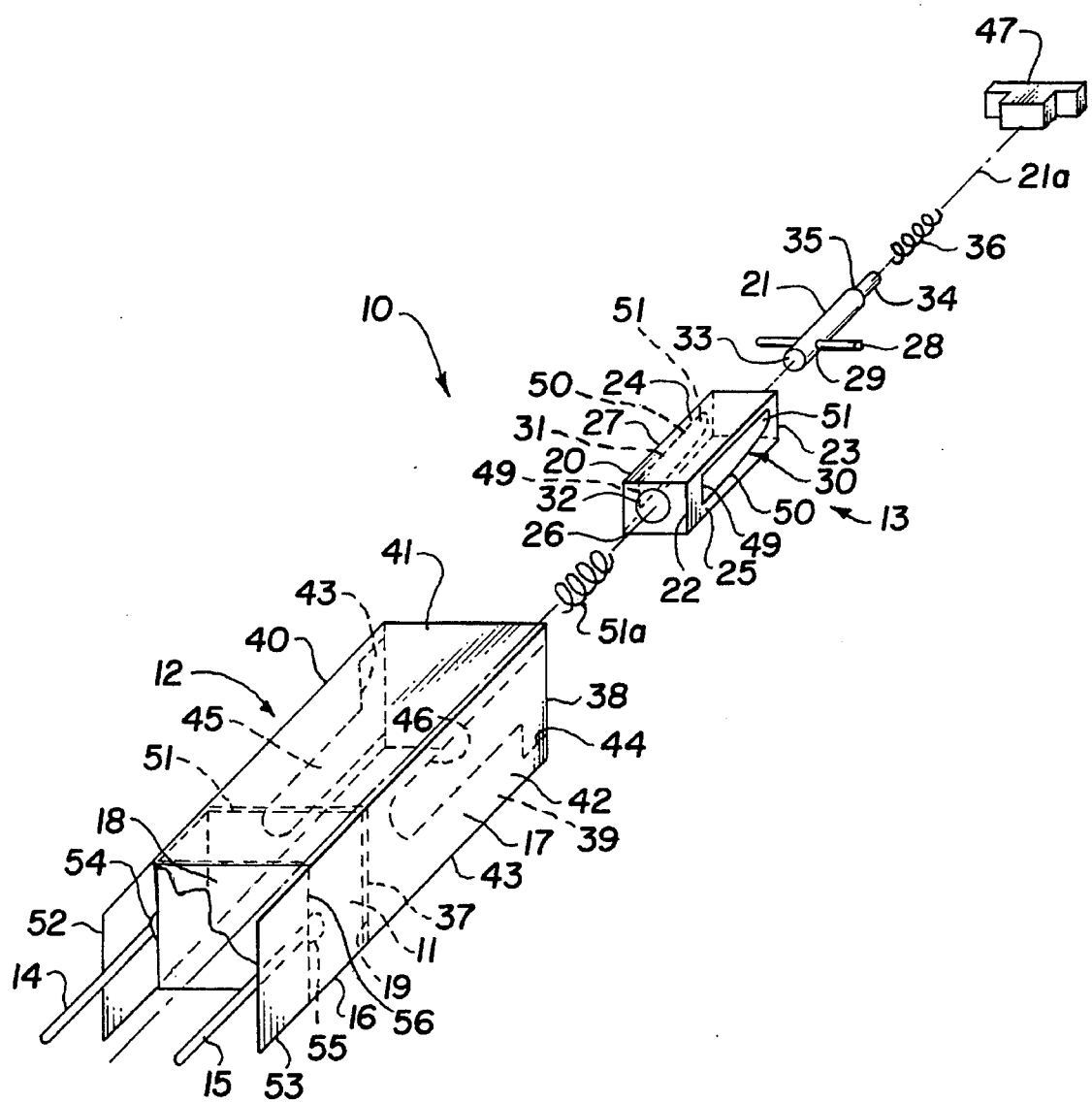
FIG. 1 is an exploded view of a preferred embodiment of the invention illustrating the actuator assembly.

The preferred embodiment of the invention comprises a tubular housing which includes a first closed end defining a compartment to capture a piezoelectric crystal and a second open end defining a shaft. The piezoelectric crystal is captured in a compartment between a first compartment wall and a second compartment wall. Preferably, the piezoelectric crystal is positioned so that its piezoelectric axis extends between the first wall and second wall of the compartment. The shaft includes a first end wall adjacent the second wall of the compartment, a plurality of side walls depending from the first end wall and an open end. The first end wall of the shaft and the second wall of the compartment include an common opening to allow communication between the shaft and the compartment. The side walls include opposed seats and opposed grooves adjacent the seats.

The actuator assembly comprises a plunger with a spring loaded ram which selectively applies a force to the piezoelectric crystal and induces the crystal to generate a voltage across its piezoelectric axis. The plunger is a hollow tubular member having a longitudinal axis and an aperture formed at a first end. The ram is a rigid cylindrical member captured in the hollow tubular member and disposed along the longitudinal axis of the plunger, with a first end partially extending through the aperture at the first end of the hollow tubular member. A spring is captured and positioned between a second end of the ram and a second end of the hollow tubular member which compresses when the plunger is inserted into the shaft of the tubular housing.

An actuator pin extends through an aperture formed in the ram and is captured in a first and second slot formed in the two sides of the tubular hollow member. As the plunger is inserted into the shaft of the housing, the pin engages and straddles the two opposed seats formed in the shaft side walls. As the plunger is pushed down the shaft, the pin bears against the seats and compresses the spring positioned between the ram and the second end of the hollow tubular member, sliding the ram along the longitudinal axis of the tubular member to a retracted position.

The slots formed in the sides of the hollow tubular member each include a base portion, a narrower neck portion and a transition portion extending therebetween. To activate the actuator assembly, the plunger is compressed into the shaft by a finger or by a lever assembly which causes the pin to push against the seats in the shaft, thereby compressing the spring and causing the ram to retract into the hollow tubular member. As the pin compresses the spring and slides along the transition portion of the slot, the shape of the slots causes the pin to translate laterally and, in turn, causes the ram to rotate. Rotation of the ram causes the pin to unseat from the seats in the shaft, unleashing the compressed spring. The ram accelerates down the tubular member from the retracted position and slams into a first end of the piezoelectric crystal.

Contacts are held adjacent the first end and a second end of the crystal to form an anode and a cathode to which a pair of spaced probes are electrically connected. The probes are preferably supported by extended sides of the housing and inserted into the weed's roots causing the electrostatic voltage to be applied across the roots when the plunger is compressed.

Weed killer apparatus employing a preferred embodiment of the invention is illustrated in FIG. 1 and generally designated by the reference character 10. Apparatus 10 is capable of generating a voltage across a pair of probes of sufficient magnitude to kill the roots of a weed to which it is applied. In the preferred embodiment, the apparatus employs a piezoelectric crystal which generates an electrostatic voltage when compressed along its piezoelectric axis. The apparatus is effective using a generated voltage as low as fifty (50) volts or lower or may generate a voltage as high as fifteen hundred (1500) volts or higher.

As best illustrated in FIG. 1, apparatus 10 comprises a piezoelectric crystal 11 captured in a tubular housing member 12 between a hammer actuator assembly 13 and first and second probes 14 and 15. Tubular housing 12 includes a compartment 16 and an open ended shaft portion 17. Piezoelectric crystal 11 is housed in compartment 16 and captured between a first end 18 and a second end 19 of the compartment 16. Hammer actuator assembly 13 is slideably disposed in shaft portion 17 and comprises a hollow tubular member 20 and a cylindrical ram 21 having a longitudinal axis 21a. Hollow tubular member 20 includes a first end 22, a second end 23 and a plurality of sides 24, 25, 26 and 27 extending therebetween.

Cylindrical ram 21 is captured in hollow tubular member 20 by an actuator pin 28 which extends through an aperture 29 provided in ram 21. Actuator pin 28 extends outwardly from the ram 21 and through first and second elongated openings 30 and 31 formed in sides 25 and 27 of the hollow tubular member 20. Pin 28 projecting outwardly from ram 21 and through openings 30 and 31 traps the cylindrical ram 21 in the hollow tubular housing 20 while permitting translation of the ram 21 along longitudinal axis 20a of housing 20 over the length of openings 30 and 31.

First end 22 of hollow tubular member 20 includes an aperture 32 through which a first end 33 of cylindrical ram 21 projects and is slideably disposed. Cylindrical ram 21 further includes a second end 34 with a reduced diameter forming an annular shoulder 35. A helical spring 36 is supported on shoulder 35 and extends between shoulder 35 and second end 23 of hollow tubular member 20. Spring 36 is partially compressed between shoulder 35 and second end 23 of hollow tubular housing 20, forcing first end 33 of ram 21 to project outwardly through aperture 32 in an extended position. When hammer actuator assembly 13 is pushed down shaft portion 17, spring 36 is preferably fully compressed and first end 33 of ram 21 is fully retracted into hollow tubular member 20 in a retracted position.

Shaft portion 17 comprises a first end 37 adjacent second end 19 of compartment 16, a second open end 38 and a plurality of sides 39, 40, 41 and 42 depending from said first end 37 and extending to the second end 38. Sides 40 and 42 include diagonally opposed seats 43 and 44 and diagonally opposed elongated pin grooves 45 and 46 adjacent seats 43 and 44, respectively. Seats 43 and 43 and 44 and grooves 45 and 46 are formed in side 40 and 42 of shaft portion 17, with grooves 45 and 46 extending substantially down the entire length of sides 40 and 42.

Figure 3:
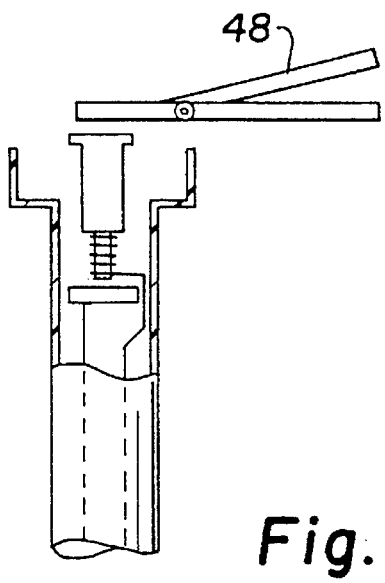
FIG. 3 is an elevational view of an embodiment of the invention which employs a lever actuator arm.
Figure 5:
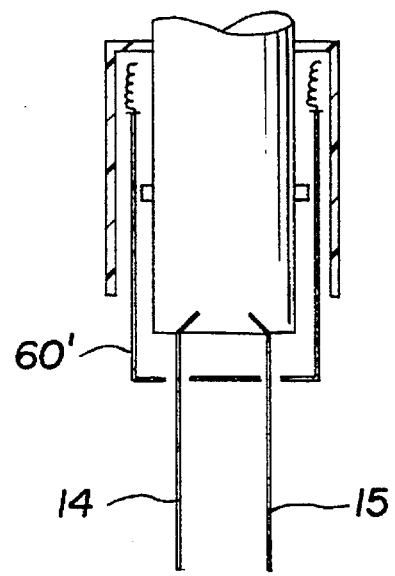
FIG. 5 is a enlarged view of the retractable probes shown in FIG. 4.

Hammer actuator assembly 13 is activated by pressure applied to a top surface 47 of the actuator 13. Pressure is applied either directly by the operator pressing on surface 47; by a lever mechanism 48 (as best shown in FIG. 3); or a plunger 48. As hollow tubular member 20 is urged down shaft portion 17 of tubular housing member 12 by the operator (not shown), pin 28 of cylindrical ram 21 engages seats 43 and 44, thereby compressing spring 36.

Each elongated opening 30 and 31 includes a wide base portion 49, a transitional portion 50 and a narrow neck portion 51. Before pressure is applied to actuator assembly 13, pin 28 rests in the seat portions 49 of the elongated openings 30. As pressure is applied to top surface 47 of actuator assembly 13, the pin 28 engages seats 43 and 44 of shaft portion 17 and compresses spring 36. As spring 36 compresses, pin 28 slides along openings 30 and 31 into the transitional portion 50 which causes the pin 28 to rotate, relative to the cross-section of the ram 21. As the pin 28 translates sideways and the ram 21 rotates, pin 28 is unseated from the seats 43 and 44. When pin 28 is unseated and no longer supported by seats 43 and 44, the stored energy of the spring 36 is unleashed and pin 28 is pushed down grooves 45 and 46 causing ram 21 to collide with a first end 51 of the piezoelectric crystal 11.

When the ram 21 collides with the first end 51 of the crystal, a voltage is generated across the crystal 11. The magnitude of the voltage varies with the size and type of piezoelectric crystal and the amount of compressive force that is applied to the crystal. Typical values, however, are in a range from about fifty (50) volts to about fifteen hundred (1500) volts. To return the actuator assembly 13 to a reactivated position, a spring 51a is provided between the first end 37 of the shaft 17 and the first end 22 of hollow tubular member 20.

To apply voltage to a weed's root, first and second probes 14 and 15 are supported between two side extensions 52 and 53 which extend from housing 12. Probes 14 and 15 are electrically coupled to the piezoelectric crystal 11 with first probe 14 connecting to a first contact 54 positioned adjacent the first end 51 of the crystal 11 and second probe 15 connecting to a second contact 55 positioned adjacent a second end 56 of crystal 11.

Figure 2:
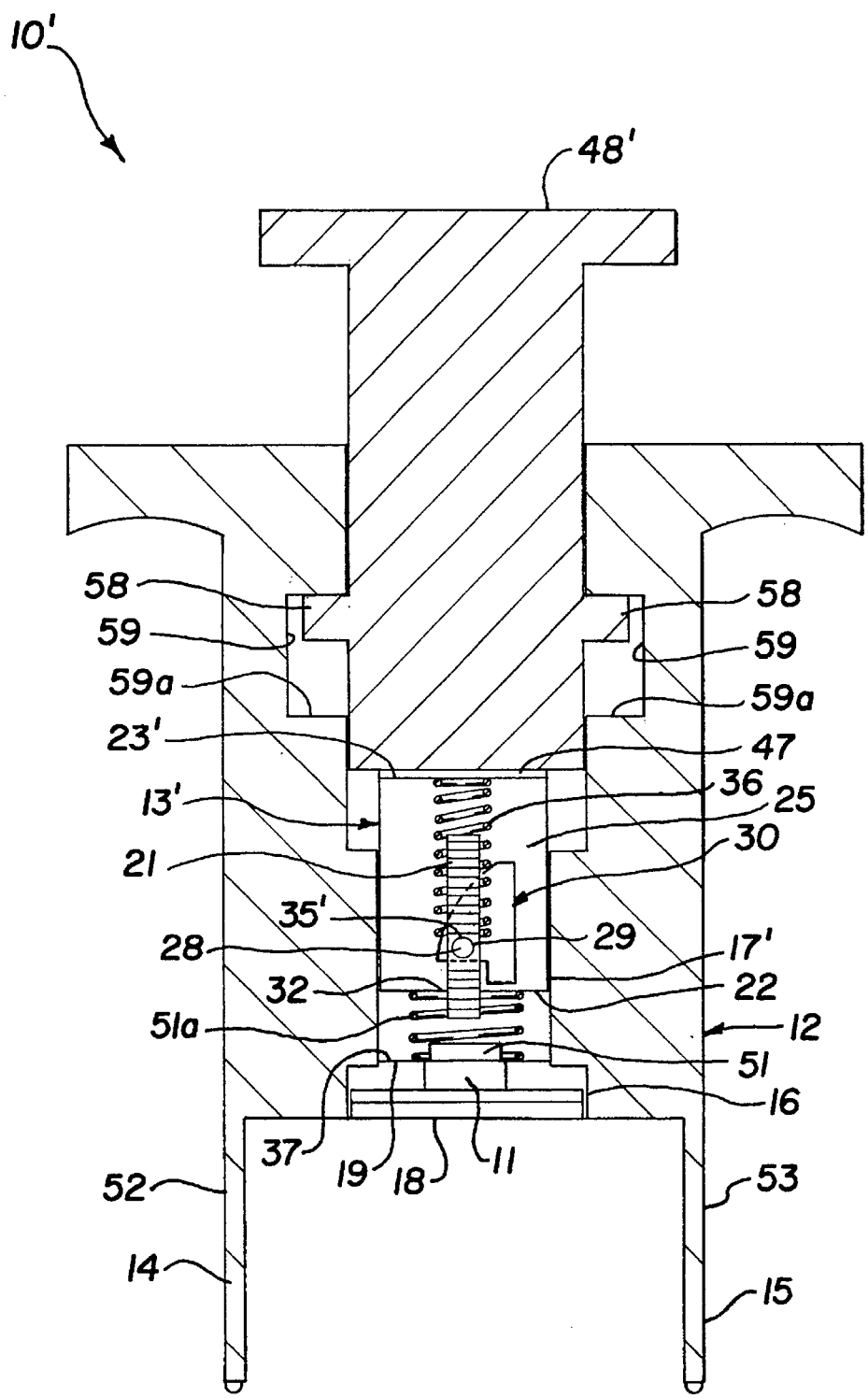
FIG. 2 is a sectional view of an alternative embodiment of the invention.

In a second embodiment of the invention (see FIG. 2) weed killer apparatus 10' includes a plunger 48' to apply pressure to top surface 47 of actuator assembly 13'. Furthermore, spring 36 is captured between second end 23' of tubular member and a shoulder 35' provided by a top surface of actuator pin 28. As in the previously described embodiment, plunger 48' is pressed by the operator to exert pressure on top surface of the actuator assembly 13'. Safety stop tabs 58 extend outwardly from the plunger 48' to engage grooves 59 formed in housing 12 and to stop further depression of plunger 48' when they bear against shelves 59a formed in grooves 59.

Figure 4:
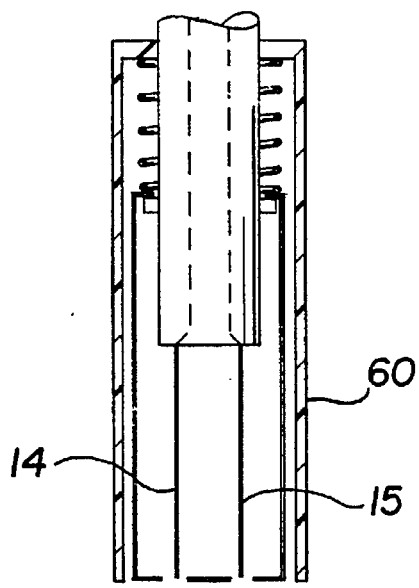
FIG. 4 is an elevational view, partially in section, of an embodiment of the invention including a pair of retractable probes.

In the embodiment illustrated in FIGS. 3 and 4, an external housing 60 is provided in which the weed killer apparatus 10 of the prior embodiment is slideably disposed. External housing 60 protects probes 14 and 15 from damage by providing a retracted position and an extended position.

Although the invention has been described with particular reference to presently preferred embodiments thereof, various modifications, alterations, variations, etc., may be resorted to without departing from the spirit and scope of the invention as defined by the appended claims.

What is claimed:

1. Weed killer apparatus comprising:
   (a) rigid non-conductive hollow housing means having an upper opening;
   (b) piezoelectric crystal means captured within said housing means;
   (c) rotatable ram means slideably disposed within said housing means for applying a compressive force to said piezoelectric crystal means and generating a voltage across said piezoelectric crystal means;
   (d) transverse pin means incorporated in said ram means;
   (e) actuator means having displacement slots biased against said transverse pin means of said ram means by a first spring means;
   (f) means for mounting said actuator means such that depressing said actuator means compresses said first spring means and said displacement slots rotate said ram means releasing said first spring means and forcing said ram means to impact said piezoelectric crystal;
   (g) plunger means slideably disposed within said upper opening of said housing means having a lower contact surface biased against said actuator means by a second spring means;
   (h) means for mounting said plunger means such that depressing said plunger means depresses said actuator means;
   (i) probe means electrically connected to said piezoelectric crystal means for applying said voltage across the roots of a weed;
   (j) sheath means incorporated within said housing means for shielding and slideably supporting said probe means such that when said plunger is depressed said probe means are extended for insertion into the roots of a weed; and (k) support means incorporated in said housing means for supporting the weed killer apparatus during use.

2. An electronic weed killer comprising:

(a) a rigid non-conductive hollow housing having an upper opening, a hollow body and a lower opening;

(b) two diametrically-opposed supports connected to the outside of the housing for supporting the weed killer during use;

(c) a rigid plunger slidably disposed within the upper opening of the housing having an exposed upper surface and a lower unexposed contact surface;

(d) a hollow slider rotator member having diagonally-oriented displacement slots and biased against the lower end of said plunger by a first spring;

(e) a rotatable ram slidably disposed within said rotator member having a transverse pin member in contact with the displacement slots and biased against said lower end of said plunger by a second spring;

(f) a protector sheath mounted within the housing;

(g) a piezoelectric crystal positioned within the housing above said lower opening and directly adjacent said ram;

(h) two rigid conductive probes conductively connected one to each end of the piezoelectric crystal;

(i) means slidably supporting said probes within the sheath, said means slidably supporting said probes mounting said probes so that when said plunger is depressed the probes extend from the sheath into the roots of a weed;

(j) means mounting said plunger to compress the second spring;

(k) means mounting the rotator member to compress, upon actuation, the first spring to rotate the ram; and (l) means mounting the ram to be forcibly displaced by the second spring to impact against the piezoelectric crystal.

* * * * *

UNITED STATES PATENT AND TRADEMARK OFFICE
CERTIFICATE OF CORRECTION

PATENT NO. : 5,600,918
DATED : February 11, 1997
INVENTOR(S) : Edwin R. Carr

It is certified that error appears in the above-indentified patent and that said Letters Patent is hereby corrected as shown below:

Col. 3, line 33, "Seats 43 and 43 and 44" should read ---Seats 43 and 44---

Col. 3, line 34, "side 40 and 42" should read ---sides 40 and 42---

Signed and Sealed this

Twenty-fourth Day of June, 1997

Attest:

BRUCE LEHMAN

Attesting Officer

Commissioner of Patents and Trademarks